United States Patent [19]
Schlichte

[11] 3,920,915
[45] Nov. 18, 1975

[54] CIRCUIT ARRANGEMENT FOR MUTUAL SYNCHRONIZATION OF THE CLOCK OSCILLATORS PROVIDED IN THE CENTRAL OFFICES OF A PCM TIME-DIVISION MULTIPLEX TELECOMMUNICATION NETWORK

[75] Inventor: Max Schlichte, Munich, Germany

[73] Assignee: Siemens Aktiengesellschaft, Berlin and Munich, Germany

[22] Filed: Sept. 20, 1973

[21] Appl. No.: 399,269

[30] Foreign Application Priority Data

Sept. 28, 1973 Germany .......... 2247666

[52] U.S. Cl. .......... 179/15 BS; 178/69.5 R
[51] Int. Cl.[2] .......... H04J 3/06
[58] Field of Search .......... 179/15 BS; 178/69.5 R

[56] References Cited

UNITED STATES PATENTS

| | | | |
|---|---|---|---|
| 3,424,864 | 1/1969 | Williams | 179/15 BS |
| 3,504,125 | 3/1970 | Inose | 179/15 BS |
| 3,555,194 | 1/1971 | Goto | 179/15 BS |
| 3,597,552 | 8/1971 | Goto | 179/15 BS |

*Primary Examiner*—Ralph D. Blakeslee

[57] ABSTRACT

For the mutual synchronization of the central office clock oscillators of a time-division multiplex telecommunication network in accordance with the phase-averaging principle, the phase comparators are directly energized with the line timing pulses and exchange timing pulses. The same synchronization results are qualitatively achieved as with combined usage of the frequency-division and the double-ended principle.

3 Claims, 3 Drawing Figures

CIRCUIT ARRANGEMENT FOR MUTUAL SYNCHRONIZATION OF THE CLOCK OSCILLATORS PROVIDED IN THE CENTRAL OFFICES OF A PCM TIME-DIVISION MULTIPLEX TELECOMMUNICATION NETWORK

BACKGROUND OF THE INVENTION

The invention relates to apparatus for use in central offices of time multiplex telecommunication systems for mutually synchronizing the central office clock oscillator with those in other parts of the system.

In conventional communication facilities, more particularly central offices, there takes place a transmission of analog signals continuous in time in channels separated physically from one another. Modern communication facilities do not make use of the aforementioned space-division multiplex principles, but of the time-division multiplex principle, whereby analog signals discontinuous in time are transmitted.

Furthermore, in recent times communication facilities are increasingly coming into use wherein a transmission of digital signals (likewise discontinuous in time) takes place. In this connection, pulse-code modulation (PCM) is of particular importance, whereby at recurring consecutive moments the instantaneous values of the amplitudes of the voice signal are represented by binary words, which are subsequently transmitted. The principal object of a PCM time-division multiplex central office consists in through-connecting the binary words appearing on the PCM receiving multiplex lines leading to the central office in time periods or slots which on these transmission lines are allocated to the individual connections, to the PCM send time-division multiplex lines leading away from the central office and selected according to the desired connection, namely, to the time slots which on these transmission lines are assigned to the individual connections. In accordance with the four-wire trunk operation of the PCM time-division multiplex lines incoming in the PCM time-division multiplex central office or outgoing therefrom, four-wire trunk switching is always involved, that is, during the switching both directions of transmission must be considered separately. For the transmission of the binary words to be transferred during a telephone connection over a PCM time-division multiplex line, switched in the nature of a four-wire trunk, connected with such a central office, the same time slot within the respective pulse frame based on the central-office pulse frame of the relevant switching center at the transmitting end is ordinarily utilized (with a view to simplifying the controlling of the synchronization of the time slots employed for both directions of transmission in the individual time-division multiplex central offices) (See, for example, Proc. IEE 111 (1964) 12, 1976–1980, 1976, right column, middle).

A requisite condition for perfect switching in a PCM time-division multiplex central office is the availability of the binary words to be switched at any given moment for through-connection at the proper time. This prerequisite is not met from the beginning, since the individual PCM time-division multiplex lines leading to a PCM time-division multiplex central office of a PCM telecommunication network usually have different propagation times which, moreover, are subject to temperature-dependent fluctuations, and since the bit rates of the individual PCM time-division multiplex central offices do not correspond to each other, at least not without further measures. To create the above prerequisite, three problems must, in principle, be solved. Small phase variations ("jitter") arising on the telecommunication circuit must be eliminated, and the bit rate variations between signals transmitted on different PCM time-division multiplex lines, that is, coming from different directions, must be compensated. Finally, in order to cause all time slots having the same ordinal number within the respective pulse frame in incoming and outgoing directions coincide in time with one another so that the switching of the call for both directions of transmission can occur simultaneously (known as "isochronous mode"), pulse frame must be compensated.

The first problem can be solved by means of a resonant circuit wherein the transmitted bits trigger a high-quality oscillator circuit determining the clock pulse of the bits thus regenerated (Proc. IEE 113 (1966)9, 1420–1428, 1422; Information Fernsprech-Vermittlungstechnik 5 (1969)1, 48–59.).

The last-mentioned problem can be solved by inserting correspondingly proportioned delay lines into the individual PCM receiving multiplex lines leading to the individual PCM time-division multiplex central offices through which the propagation time on the relevant PCM time-division multiplex line is supplemented by a whole multiple of the frame period of the information bit. By this means, the pulse frames of all PCM multiplex lines leading to the relevant PCM time-division multiplex central office coincide in time with one another, as well as with the pulse frames of all the PCM transmitting multiplex lines leading away from the central office and correspond to the central-office pulse frames of the respective PCM time-division multiplex central office (see BSTJ XXXVIII(1959)4, 909–932, 922; Proc. IEEE, 111(1964)12, 1976–1980, 1976, right column above; Proc. IEE, 113(1966)9, 1420–1428, 1421, first column above; Information Fernsprech-Vermittlungstechnik 5 (1969)1, 48–59, 53). In connection with the above frame equalization, a compensation of temperature-dependent propagation time variations can concurrently be carried out (see, for example, Proc. IEE, 113 (1966)9, 1420–1428, 1421, right column; Information Fernsprech-Vermittlungstechnik 5 (1969)1, 48–59, 53).

Various solutions are known for the compensation of bit-rate variations (see Proc. IEE, 113 (1966)9, 1420–1428, 1421; Information Fernsprech-Vermittlungstechnik 5 (1969)1, 48–59, 51).

In the asynchronous (heterochronous) mode, each PCM time-division multiplex central office has its own independent clock generator and each time-division multiplex receiving line opens into a "Storage", the capacity of which corresponds to the number of bits per pulse frame, and wherein the received binary words are retained until they fit into the pulse frame of the relevant PCM time-division multiplex central office (at the same time, the Storage performs the frame equalization referenced hereinabove).

In the quasi-synchronous mode (dummy bit mode) the PCM time-division multiplex central offices of a network have their own independent clock generators, but the information bit rate, that is, the mean number of intelligence-carrying bits per second is made equal for all PCM time-division multiplex central offices of the entire PCM telecommunication network by compensating the difference between the clock frequencies of the individual PCM time-division multiplex central offices and the uniform information bit rate through the insertion of information-less bits, known as dummy bits.

In the servosynchronous mode (homochronous mode, master-slave mode), a central clock generator determines the bit rate of the individual PCM time-division multiplex central offices of a PCM telecommunication network.

Finally, in the autosynchronous mode the individual PCM time-division multiplex central offices have individual clock generators which, however, are not independent of one another but synchronize each other, for example, according to the phase averaging principle.

As generally known, for this purpose, in the individual central offices of a PCM telecommunication network, phase discriminators allocated to individual lines are assigned to incoming multiplex lines; the phase discriminators are energized at the input end with a pulse train corresponding to the respective line bit rate and with a pulse train corresponding to the central office bit rate of the particular central office. The output signals from the phase discriminators correspond to the respective phase shifts between the relevant line pulse and the central office pulse, and are combined over a cumulative-value or mean-value-producing element to generate the control signal for the frequency regulation of the central office pulse oscillator. Such phase shifts can be caused by different clock frequencies of the clock oscillators provided in the individual central offices of the telecommunication network and/or by variations in line propagation times.

In this connection, it is known (see ECJ 49 (1966) 11, 165), in view of variations in line propagation times to employ as a pulse train corresponding to the respective line bit rate or the central office bit rate a pulse train whose clock frequency represents a submultiple of the clock frequency of the bits. This may be done (see ECJ 49 (1966) 11, 167) by feeding a pulse generated by a pulse frame detector to a flip-flop circuit performing the phase comparison during a given phase of the first time slot of each pulse frame of the incoming time-division multiplex line and by feeding each time a pulse in a given phase of the time slot nearer the middle of each pulse frame to the central office concerned. It may also be carried out in a manner such (see NTZ (1970) 5, 257–261) that in the individual central offices of a PCM telecommunication network the line bit rates of the individual incoming PCM time-division multiplex lines are obtained by means of resonant circuits from the received PCM signals whose phase shifts with respect to the central office pulse of the relevant central office shall cause the regulation of the clock oscillator supplying said central office bit rate. The line bit rate and central office bit rate are fed to two frequency dividers, which start the frequency division, preferably displaced by 180, and between the output pulse trains a phase comparison is carried out with the aid of a flip-flop circuit. The DC mean value of the output signal of the flip-flop circuit is proportional to the phase difference and, hence, proportional to the integral of a frequency difference, namely, the difference between line clock frequency and central office clock frequency. The output signals of all the flip-flop circuits are added over (generally identical) resistances for taking the mean, and they are smoothed over an RC network. The capacitor voltage then can readjust the clock rate of the central office clock oscillator over a varactor diode. The reset edge 35 of the central office frequency divider acts at any given moment on the counter input of the individual flip-flop circuits allocated to the two flip-flop circuit systems. If a trunk clock fails, then the associated flip-flop circuit runs as a counter with a pulse-separation ratio of 1:1, which leads to a control voltage corresponding to an agreement between line clock frequency and central office clock frequency. The oscillator frequency which develops when all switching stages have a pulse separation ratio of 1:1 is designated as oscillator no-load frequency or clock frequency of the uncontrolled clock oscillator.

In connection with the 180° displacement referenced above, with the determination above discussed of the pulse repetition rate of the pulse trains corresponding to the respective line bit rate or the central office bit rate and subject to the actual phase comparison to the effect that the respective bit clock frequency represents a multiple of the respective pulse repetition rate, a frequency control range is aspired to and obtained that the phase differences caused by the existing frequency tolerances of the clock oscillator available in the nodes (central offices or regenerative repeaters along the route) of the time-division multiplex telecommunication network as well as the phase differences caused by the propagation time fluctuations on the time-division multiplex lines of the time-division telecommunication network interconnecting the nodes between trunk clock and exchange clock in the ongoing regulating process are determined without requiring the point about which regulation occurs to leave the area of a sawtooth characteristic.

There are two special control procedures in the case of a mutual synchronization of the nodes of a time-division multiplex telecommunication network according to the phase averaging principle, namely, the single-ended and the double-ended methods. With synchronization according to the single-ended method, as explained hereinabove, the sum or the mean value of the individual phase differences occurring between the pulse train corresponding to the trunk clock and a pulse train corresponding to the exchange clock is employed as a regulated variable for the exchange clock oscillator concerned. With synchronization according to the double-ended method, in addition thereto, the phase comparison result occurring in the corresponding phase comparator of the respective adjacent node is also utilized for control by subtracting the latter prior to averaging from the corresponding phase comparison result of the node currently being considered (see NTZ (1970) 8, 402–411, 408).

In contradistinction to synchronization according to the single-ended method, in synchronization according to the double-ended method influences due to variations in the propagation time on the clock frequency are compensated, and the control range of the exchange clock oscillator can be correspondingly smaller than in the case of synchronization according to the single-ended method. However, compared with the single-ended method, the double-ended method requires an additional transmission of control data between the individual network junctions of the PCM telecommunication network.

The invention seeks to provide a method for mutually synchronizing, without special technical expenditures, the exchange clock oscillators provided in the network nodes or junctions (central offices or regenerative repeaters along the route) of a digital time-division multiplex telecommunication network corresponding to the combined usage (known from NTZ (1970) 8, 402–411, 408) of the frequency division principle, i.e., the principle of a phase comparison between pulse trains whose pulse repetition rate is a submultiple of the clock frequency of the bits, and the double-ended principle.

SUMMARY OF THE INVENTION

In accordance with the invention the foregoing and other objects are achieved in a circuit arrangement for the mutual synchronization of exchange clock oscillators provided in the network nodes of a time-division multiplex telecommunication network comprising a plurality of interconnected network nodes. In each network node there are provided phase discriminators allocated to individual lines and connected to the time-division multiplex lines incoming in the network node. Each of the phase discriminators are energized at its input with a pulse train corresponding to the respective trunk clock and with a pulse train corresponding to the respective exchange clock. The output signals from the phase discriminators are combined over a cumulative-value or mean-value-producing element and generate control signals for the frequency regulation of the exchange clock oscillator.

According to the invention, in this circuit arrangement the phase discriminators are energized with pulse trains whose pulse spacings are smaller than the expected variations in the propagation time of the time-division multiplex lines. As used herein, the term "pulse spacing" refers to the interval between the corresponding pulse times of two consecutive pulses.

The invention results in substantial technical savings, since no circuit elements are required for determining certain frame pulses or circuit components for the frequency division, nor are circuit elements for the transmission of double-ended control data required. Yet, qualitatively, the same synchronization results are obtained, as would be obtained with a combined usage of the frequency-division principle and the double-ended principle, by not making particular allowance for and counteracting the influence of fluctuations in the line propagation time. To the contrary, by letting these fluctuations in the line propagation time take there full effect, namely, without being concerned with a frequency division, if necessary in conjunction with generation of a reference phase, that the control process always takes place in the area of one and the same sawtooths of the sawtooth phase comparison characteristic.

In a further development of the invention, a flip-flop circuit, provided as a phase discriminator, is energized at an input assigned to one of two switching circuits with a pulse train corresponding to that of the respective trunk clock, and at an input assigned to one of the two switching circuits with a pulse train corresponding to that of the exchange clock. In each case with the energizing pulse train has a pulse spacing which is small as compared with the expected variations of the propagation time of the time-division multiplex lines. In particular, according to a further development of the invention, such phase discriminators can immediately be energized with the bit rate pulse train of the respective time-division multiplex line and with the bit rate pulse train of the respective exchange clock oscillator. This has the additional advantage that bit rate pulse trains that must be generated for other purposes can immediately be utilized.

According to a further development of the invention, the input of the flip-flop circuit allocated to both switching circuits can be connected to two control lines carrying the exchange timing pulses with a mutual displacement of 180°, over a gating circuit which at any given moment when the timing pulse appearing on a control line and the clock timing pulse of the respective time-division multiplex line are in phase changes over to the other control lines. This has the additional advantage that undesired regulating jumps are avoided by an artificially inserted hysteresis in the case of a regulating point full of jitter and lying in the unsteady area of the sawtooth characteristic.

The function of the circuit arrangement according to the invention is the same as would be obtained if a combined use is made of the frequency division principle (i.e., the principle of a phase comparison between pulse trains corresponding to trunk clock and exchange clock and whose pulse repetition rate is a submultiple of the clock rate of the bits) and the double-ended principle, such that the phase difference between the timing pulse trains compared with one another, each producing a pulse frame and reduced by the next smaller whole number of bit distances, becomes active in a frequency regulating manner.

BRIEF DESCRIPTION OF THE DRAWINGS:

The principles of the invention will be more readily understood by reference to the description of preferred embodiments given hereinbelow in conjunction with the drawings.

Figure 1:
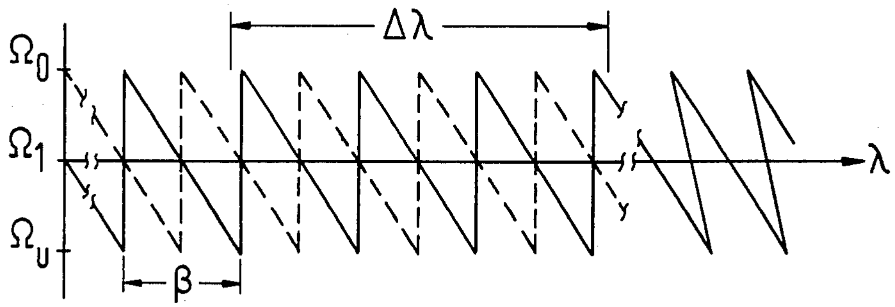
FIG. 1 is a waveform diagram illustrative of the output of a phase comparator contained in the described preferred embodiments.

DETAILED DESCRIPTION OF THE DRAWINGS:

The FIG. 1 diagram, wherein the dotted linear graph should for the moment not be considered, shows, for a circuit arrangement according to the invention, the output signal of a sawtooth phase comparator, and at the same time, the corresponding frequency response of the exchange clock oscillator controlled in a circuit arrangement according to the invention as a function of the line propagation time. The line propagation time is labeled $\lambda$. $\Delta\lambda$ denotes the range of variation to be expected of the propagation time. $\Omega l$ is the no-load frequency of the oscillator. The upper oscillator frequency $\Omega o$ and the lower oscillator frequency $\Omega u$ define the control range of the exchange oscillator. Finally, $\beta$ is the duration of a bit interval.

As apparent from FIG. 1, the phase-comparator control characteristic exhibits an almost sawtooth-shaped waveform, in which the sawtooth period equals the duration of a bit interval. This is the case if the phase discriminator is directly energized with the timing pulse train of the associated time-division multiplex line and with the timing pulse train of the respective exchange clock oscillator. As is likewise apparent from FIG. 1, the pulse spacing $\beta$ of said pulse trains fed to the phase comparator is substantially smaller than the range of variation of the propagation time $\Delta\lambda$.

Figure 2:
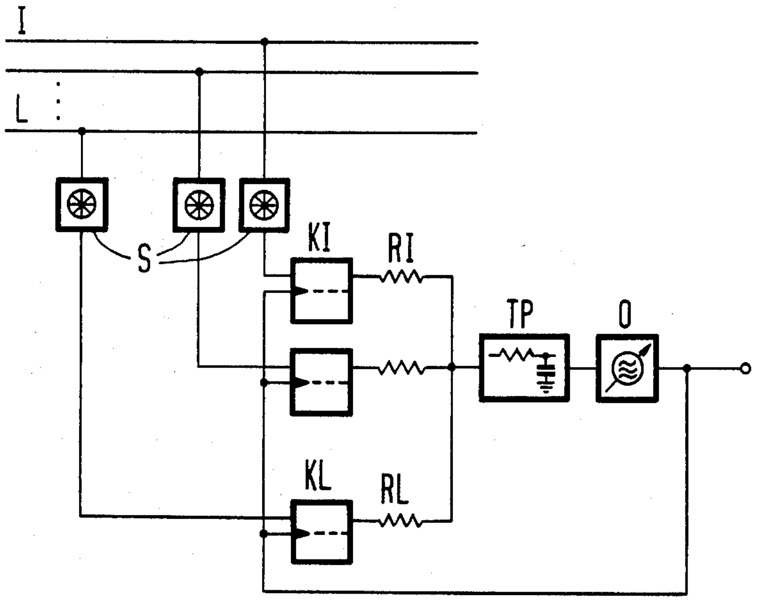
FIG. 2 is a schematic diagram of a first preferred embodiment of a mutual synchronization circuit.

A circuit arrangement, with the aid of which the frequency-control characteristic, as shown in the FIG. 1 diagram by the unbroken line can be obtained, is illustrated in FIG. 2. FIG. 2 is a schematic diagram of a synchronizing circuit operating according to the phase average principle. This circuit arrangement included, for example, in a central office of a PCM time-division multiplex telecommunication network comprising a plurality of such central offices has an exchange clock oscillator O which shall be synchronized according to the phase averaging principle. This synchronization is carried out by means of the oscillators of said other central offices over the time-division multiples lines I . . . L coming from said other central offices.

From the incoming time-division multiplex lines I . . . L employed for the actual intelligence-signal transmission the line timing pulse coming from the oscillators provided in said other correspondingly constructed central offices are fed directly to phase discriminators allocated to individual lines the phase discriminators being in the form of flip-flop circuits KI . . . KL. These pulses are applied to inputs of the flip-flops over resonant circuits S one such resonant circuit being in each input line (a suitable resonant circuit for this purpose is, for example, disclosed in FIG. 5 of the U.S. Pat. No. 3,483,330). Furthermore, each of the flip-flop circuits KI . . . KL has an input connected to the output of the clock oscillator for the illustrated exchange. The DC mean value of the output signal of each flip-flop, thus, corresponds (in a cyclical function) to the phase difference between the respective line bit rate and the exchange bit rate. The output signals of the flip-flop circuits KI . . . KL are added over a summing network constructed using resistors RI . . . RL. The output of the summing circuit is coupled to a subsequent low-pass filter TP. The output signal of the low-pass filter TP generates the control signal to be fed to the control input of the exchange clock oscillator O whose frequency shall be controlled in the known manner.

The circuit arrangement for obtaining frequency-control characteristics, as illustrated in FIG. 1 by means of the unbroken line, can, according to the invention, be provided without particularly great outlay for circuit elements. Otherwise, in order to obtain such frequency-control characteristics, as shown by the unbroken line in FIG. 1, synchronizing circuits must be provided wherein, between the individual incoming time-division multiplex lines and the associated phase comparators, each having a corresponding control kurtosis [defined as the quotient of (caused) clock frequency variation and (causing) phase difference], correspondingly proportioned clock frequency dividers are inserted. These produce phase comparison results which are fed in quantized form to the phase comparators from the corresponding phase comparators of adjacent network junctions for purposes of subtraction. The quantization steps are determined by the product of control kurtosis [$(\Omega_o - \Omega_{\overline{u}})/\beta$] in FIG. 1 and pulse period ($\beta$ in FIG. 1).

It should be noted at this juncture that in the FIG. 2 circuit arrangement the phase discriminators KI . . . KL are directly energized with the line pulse train and with the exchange pulse train. However, the phase discriminators may also be energized with other pulse trains corresponding to the respective line bit pulse or the exchange bit pulse, whose pulse spacings are small with respect to or, more generally, are smaller than, the expected variations in the propagation time.

Figure 3:
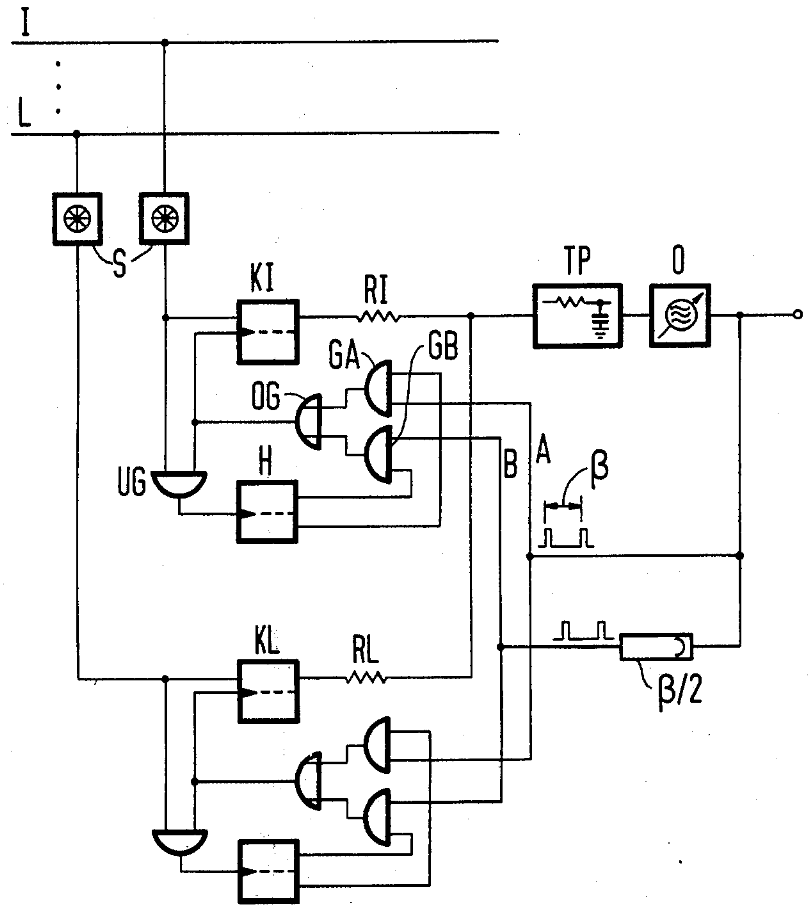
FIG. 3 is a schematic diagram of a second preferred embodiment of a mutual synchronization circuit according to the invention.

A modification of the FIG. 2 circuit arrangement is shown in FIG. 3. In the FIG. 3 arrangement, just as in the FIG. 2 circuit arrangement, the individual trunk bit pulses are first fed over resonant or flywheel circuits S directly to the flip-flop circuits KI . . . KL forming the phase discriminators, whose output signals joined by a summing network RI . . . RL control the frequency of the exchange clock oscillator O over a low-pass filter TP.

In departure therefrom, the input of the flip-flop circuits KI . . . KL assigned to both flip-flops is connected to two control lines A, B carrying the exchange timing pulses with a mutual displacement of 180° over a gate which, when timing pulses appearing on a control line A or B and the line timing pulse of the respective time-division multiplex line (I) are in phase, changes over to the other control lines B or A.

To this end, in the embodiment according to FIG. 3 the two control lines A and B are each connected to the respective flip-flop inputs over two AND elements GA and GB joined by a subsequent OR element OG, whereby the two other inputs of both AND elements GA and GB are connected to both outputs of an auxiliary flip-flop H. Depending on the operating condition of the auxiliary switching stage H, the AND element GA or the AND element GB is capable of transmitting. An individual AND gate UG leads to the input of each auxiliary flip-flop H assigned to each flip-flop circuit. One input of the AND gate UG is connected to the output of the associated flywheel circuit S. A frequency control characteristic is obtained with the FIG. 3 circuit arrangement as shown in FIG. 1 with the two symmetrically interlaced sawtooth curves.

When the limits of the currently valid control range are reached, that is, when the regulating point reaches the end of the sawtooth waveform, the auxiliary flip-flop H of the respective phase comparator circuit switches from its current operating condition to the other operating condition. Thus the regulating point lies in the area from the end of the respective sawtooth, for example, of the unbroken sawtooth characteristic shown in FIG. 1, to the middle of the subsequent sawtooth, for example, of the dotted sawtooth characteristic shown in FIG. 1. In this way, an undesired repeated jumping of the regulating point in the vicinity of a sawtooth edge is assuredly avoided by a control direction dependent displacement of an irregularity, that is, by an artificially inserted hysteresis, even when the regulating point is full of jitter.

In this connection, it may be mentioned that a control characteristic as, for example, shown by the unbroken line in FIG. 1, already has a certain "natural" hysteresis even without additional measures as depicted in FIG. 3. An examination as to quantity shows that if the line propagation times are sufficiently large, this natural hysteresis, shown in the right-hand portion of FIG. 1, may, under certain circumstances, be adequate for avoiding undesired control jumps.

The principles of this invention have been described herein in terms of two preferred embodiments, which are set forth only as examples of these principles. It is contemplated that the described embodiments may be modified or changed while remaining within the spirit and scope of the invention, as defined by the appended claims.

I claim:

1. Apparatus for mutual synchronization of clock oscillators provided in nodes of a time division multiplex telecommunication network, the nodes of said network being interconnected by a plurality of time multiplex transmission lines comprising:

clock oscillator means in each said network node constructed to produce pulse trains having pulse spacings smaller than expected variations in the propogation time of said transmission lines, at least one phase discriminator means assigned to each incoming line to a said network node, said phase discriminator means having an input connected to an output of said clock oscillator in said network node and an input connected to said incoming line for receiving pulse trains having pulse spacings smaller than expected variations in the propogation time of said transmission lines, summing means connected to receive outputs from said phase discriminator means and for producing a frequency control signal for said clock oscillator, and means in said clock oscillator for regulating the frequency thereof responsive to the value of said control signal.

2. The apparatus defined in claim 1 wherein said phase discriminator means comprises a bistable switching circuit.

3. The apparatus defined in claim 1 further comprising:

means for displacing the output of said clock oscillator by 180°, gating means coupled, respectively, to each said phase discriminator means for switching between the output of said means for displacing and the output of said clock oscillator means when one of these outputs is in phase with the signal on said incoming line, and additional bistable switching circuit means coupled, respectively, to each said phase discriminator means having an input connected to said incoming line and to the outputs of said displacing means and said clock oscillator means over said gating means, the outputs of said additional bistable switching circuit means being connected, respectively, to inputs of said gating means, the output of each said gating means being connected to an input of the said phase discriminator means associated therewith.

* * * * *